US012681848B2

(12) United States Patent
Fan et al.

(10) Patent No.: US 12,681,848 B2
(45) Date of Patent: Jul. 14, 2026

(54) MEMORY APPLIANCE SHARING MEMORY BETWEEN MULTIPLE HOSTS

(71) Applicant: Seagate Technology LLC, Fremont, CA (US)

(72) Inventors: Hongjian Fan, Shakopee, MN (US); Jon D. Trantham, Chanhassen, MN (US); Mohamad El-Batal, Superior, CO (US); Matthew Julius Totin, Shakopee, MN (US); David Jerome Allen, Longmont, CO (US); Matthew Bruce Lovell, Longmont, CO (US); Kevin Lee Van Pelt, Longmont, CO (US)

( * ) Notice: Subject to any disclaimer, the term of this patent is extended or adjusted under 35 U.S.C. 154(b) by 0 days.

(21) Appl. No.: 18/759,701

(22) Filed: Jun. 28, 2024

(65) Prior Publication Data

US 2026/0003777 A1     Jan. 1, 2026

(51) Int. Cl.
G06F 12/02     (2006.01)
G06F 9/4401     (2018.01)
G06F 15/173     (2006.01)

(52) U.S. Cl.
CPC ...... G06F 12/023 (2013.01); G06F 15/17331 (2013.01); G06F 9/4401 (2013.01); G06F 2213/0026 (2013.01)

(58) Field of Classification Search
None
See application file for complete search history.

(56) References Cited

U.S. PATENT DOCUMENTS

2021/0373951 A1 * 12/2021 Malladi ................. G06F 9/5016
2022/0014588 A1     1/2022 Guim Bernat et al.

2022/0114086 A1 *  4/2022 Clark ..................... G06F 9/5016
2023/0289074 A1 *  9/2023 Choi ...................... G06F 9/5016
2023/0385220 A1 * 11/2023 Li ........................ G06F 13/1663
2023/0393970 A1    12/2023 Hornung et al.
2024/0012684 A1     1/2024 Jung et al.
2024/0028201 A1     1/2024 Berke
2024/0264759 A1 *  8/2024 Enamandram ........ G06F 3/0647
2025/0138737 A1 *  5/2025 Yu ........................ G06F 3/0631

FOREIGN PATENT DOCUMENTS

CN          117170882 A  * 12/2023   ........... G06F 12/023

OTHER PUBLICATIONS

Compute Express Link Consortium. Compute Express Link™ (CXL™) Specification. Oct. 2020. Rev. 2.0.*
Li et al. "Pond: CXL-Based Memory Pooling Systems for Cloud Platforms." Mar. 2023. ACM. ASPLOS '23. pp. 574-587.*
Translation of CN-117170882-A. 2025.*

* cited by examiner

*Primary Examiner* — Nathan Sadler
(74) *Attorney, Agent, or Firm* — HOLZER PATEL DRENNAN

(57)          ABSTRACT

The technology disclosed herein provides a method of sharing a memory appliance memory between multiple devices, the method including scanning by a host device, at host boot up, a plurality of memory devices to determine if one of the plurality of devices is a compatible memory device, reconfiguring the compatible memory device as offline system memory, receiving from the compatible memory device an indication of an amount of shared memory available on the compatible memory device, and labeling each block of a plurality of memory blocks on the compatible storage device as offline within a host memory map on the host device.

20 Claims, 8 Drawing Sheets

100

102a

102b

104a

104b

106a

106b

114

110

112a

112h

400

702    Receive indication of memory available on memory appliance

704    Mark blocks as offline

706    Determine available internal memory level

708    Lock a memory block

710    Mark blocks as online

712    Write data to the block

800

818

802

I/O
804

812

CPU
806

808

Communication
Interface
824

814

MEMORY APPLIANCE SHARING MEMORY BETWEEN MULTIPLE HOSTS

BACKGROUND

Many organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

SUMMARY

The technology disclosed herein provides mechanism to manage memory allocation on-the-fly between multiple host servers from a memory appliance.

The technology disclosed herein provides a method of sharing a memory appliance memory between multiple devices, the method including scanning by a host device, at host boot up, a plurality of memory devices to determine if one of the plurality of devices is a compatible memory device, reconfiguring the compatible memory device as offline system memory, receiving from the compatible memory device an indication of an amount of shared memory available on the compatible memory device, and selectively labeling each block of a plurality of memory blocks on the compatible storage device as online or offline within a host memory map on the host device.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
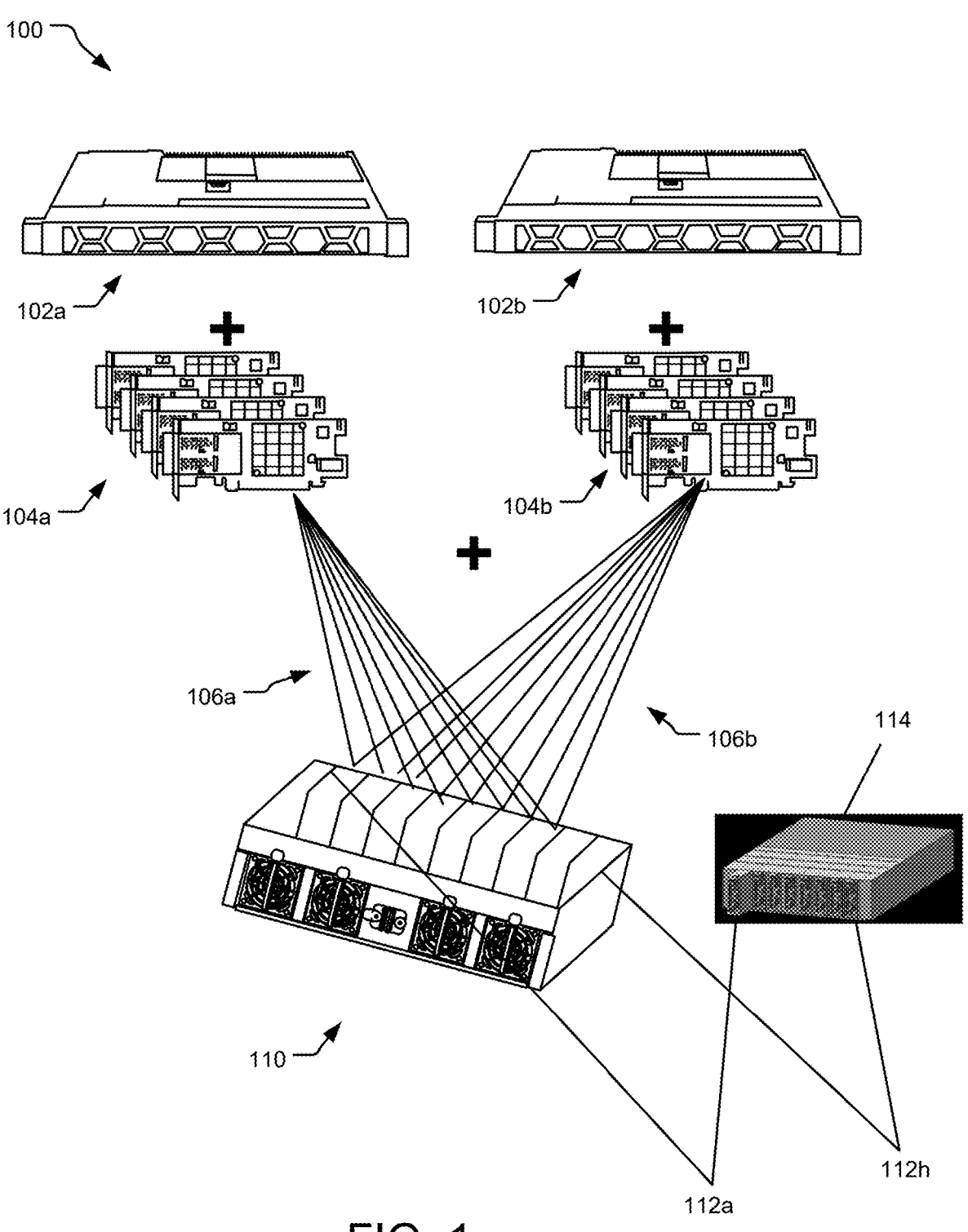
FIG. 1 illustrates an example block diagram of a system disclosed herein providing software assisted memory appliance pooling between multiple hosts.

Memory is an important component of modern computers. Larger memory size allows more applications in parallel and quicker response from the application. And many applications such as in-memory databases, AI, and video encoding tend to use more memory in exchange for better performance. Nowadays, memory cost takes up a large portion of the TCO on high performance servers. To avoid applications running out of memory, servers are built with over provisioned memory, which is not efficient usage for memory resource.

Compute Express Link (CXL) is an open industry standard interconnect offering high-bandwidth, low-latency connectivity between host processors and devices such as accelerators, memory buffers, and smart I/O devices. CXL protocol brings a way to extend the size of the memory. A memory appliance supports memory extension to multiple host servers at the same time. However, current architectures require host reboot for any hardware level memory size change. Memory appliances are designed to address growing high-performance computational workloads by supporting heterogeneous processing and memory systems with applications in artificial intelligence (AI), machine learning (ML), analytics, cloud infrastructure, cloudification of the network and edge, communication systems, and high-performance computing (HPC). It does this by enabling coherency and memory semantics on top of the PCI Express® (PCIe®) protocol (i.e., as defined by PCI Express® Base Specification Revision 5.0 or later) for optimized performance in evolving usage models. This is increasingly important as processing data in these emerging applications requires a diverse mix of scalar, vector, matrix, and spatial architectures deployed in CPU, GPU, FPGA, smart NICs, and other accelerators with a corresponding mix of memory capacity and performance requirements.

The implementations disclosed herein provide shared memory between various hosts. Specifically, the implementations disclosed herein relate to a memory sharing model works that for a server cluster where several work servers are connected to the same memory appliance via compute-express links (CXL). CXL is a coherent external processor-memory interface. Implementations of the CXL may be used an external memory interface.

The work servers are also known as CXL hosts. The memory appliance may be a CXL type-3 (most typically) or a CXL type-2 composable memory device. It provides memory expansion to the CXL hosts connected to it. In specific implementations, each CXL host may have additional CXL links connected to the memory appliance for extra bandwidth.

The disclosed implementations provide a method of initialization for configuring the memory appliance into the memory sharing mode before the CXL host boots up using predetermined memory allocations for the hosts. Alternately, the memory sharing of the memory appliance may be configured dynamically after the CXL host(s) boot up. Furthermore, the implementation also provides a service agent to monitor memory usage when the system (with CXL hosts connected to the memory appliance) is running.

FIG. 1 illustrates an example block diagram of a system 100 providing software assisted memory appliance pooling between multiple hosts. Specifically, the system 100 illustrates two host computer servers 102a and 102b that are utilizing the pooling memory of the memory appliance 110.

In one implementation, the hosts 102 may be connected to the memory appliance 110 via one or more a coherent external processor-memory interface cables 106a, 106b. In one implementation, the coherent external processor-memory interface cables 106 may be compute express-link. (CXL) interface cables. The interfaces 106 may be used to share, expand, or pool memory for the hosts 102. In the implementation disclosed herein, the hosts 102 connect with the interfaces 106 using an add-in card (AIC), such as a retimer AIC cards 104a, 104b. The Retimer AIC cards 104 may vary in the quantity and configuration of interface quantities (i.e., links) and lanes. For example, an AIC may be a 4×16 (i.e., four link sets with each link containing sixteen bi-directional lanes), 8×8, 4×4, etc. Retimer AIC cards may connect to the appliance with the interface cables 106. The interface cables 106 may in-turn connect to sockets configured on the memory appliance 110, for example to an 8×8 socket. In alternate embodiment the connection may be made by optical interconnects using optical fiber interface cables, including the necessary componentry to facilitate optical interconnections.

While the implementation in FIG. 1 illustrates two hosts 102, in alternative implementation, the memory appliance 110 may be connected via the interface cables 106 to multiple hosts 102. Thus, for example, the memory appliance 110 may be connected via the interface cables 106 to 4, 8, 16, or more hosts 102. The memory appliance 110 may include several memory blades 112a-112h. The memory appliance 110 may also include a memory controller 114 communicatively connected to the memory blades 112.

The hosts 102 may share and pool the memory from the memory appliance 110 using the interface cables 106 to expand their internal memory capabilities. This allows the hosts 102 to overcome the problem with having limited memory available for various compute tasks. Allowing the hosts 102 to expand the size of the DRAM memory that is available to them for compute tasks by pooling the memory from the memory appliance 110 allows each of the hosts 102 to be able to handle compute tasks that require high amount of memory without having to configure additional memory on the hosts 102. In one implementation, the internal memory of the hosts 102 and the memory of the memory appliance 110 may include removable memory (e.g., DIMMs) that have read times between approximately 30 and 100 nanoseconds.

The implementation disclosed herein provides a software assisted memory sharing method that allows the hosts 102 to allocate pooled memory from the memory appliance 110 on-the-fly between the multiple hosts 102. The software-assisted memory sharing between the hosts 102 is disclosed in further detail below in FIGS. 2-6. In one implementation, the hosts 102 communicate directly with the memory appliance over the PCIe interface to allocate or deallocate memory. In an alternate implementation, the hosts 102 communicate out-of-band with the memory appliance, such as over Ethernet to allocate and/or deallocate memory. The hosts may also use these interfaces to determine their allocated capacity or alternately they may determine their allocated memory capacity via PCIe and/or CXL configuration-space registers or via CXL Data Object Exchange, for example to retrieve the Coherent Device Attribute Table (CDAT) to determine their allocated memory and its characteristics.

Figure 2:
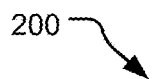
FIG. 2 illustrates an alternative example block diagram of a system disclosed herein providing software assisted memory appliance pooling between multiple hosts.
Figure 2:
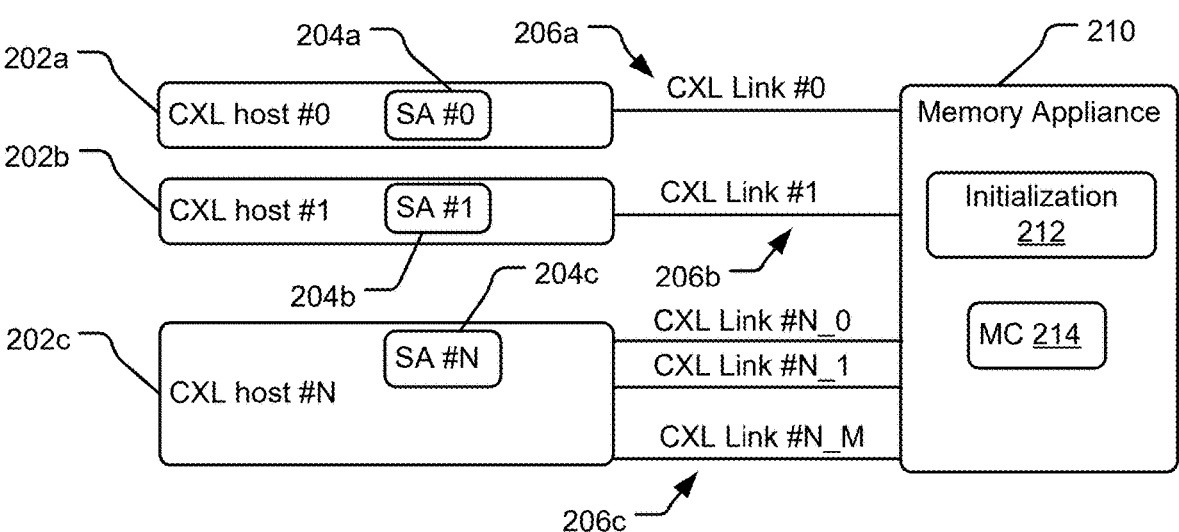

Specifically, FIG. 2 illustrates an alternative implementation of a system 200 providing software assisted memory appliance pooling between multiple hosts 202. The hosts 202 may be work servers and may be referred to here as CXL hosts. The memory appliance 210 may be a CXL type 3 composable memory appliance. The hosts 202 are connected to a memory appliance 210 via a number of CXL interfaces 206. For example, the CXL host 202a is connected to the memory appliance 210 via a CXL link #0 206a, the CXL host 202b is connected to the memory appliance 210 via a CXL link #1 206b, etc. As shown herein, the CXL host 202c is connected to the memory appliance 210 via several CXL links #N 206c, wherein the CXL links #N includes multiple links for extra bandwidth.

The memory appliance 210 includes firmware that supports the connectivity to the CXL interfaces 206. For example, the memory model support firmware on the memory appliance 210 may provide a Designated Vendor-Specific Extended Capability (DVSEC) register in PCI-e (Peripheral Component Interconnect Express) configuration space with one or more lock bits and a lock bit map. The size of such register may be determined based on the maximum quantity of configurable memory segments or blocks of the memory appliance 210 and may vary depending upon the total size of the shared memory on the memory appliance 210, as well as the minimum size of preconfigured memory blocks on the memory appliance 210.

Each of the hosts 202 includes a service agent 204 that is configured to control memory initialization and dynamic memory online and dynamic memory offline operations. In one implementation, each of the hosts 202 has the operating system (OS) memory block size that is same as the host OS memory block size of the other of the hosts 202. Furthermore, in the illustrated implementation, the host OS memory block allocation size of the hosts 202 is same as the size of the preconfigured memory blocks on the memory appliance 210. Thus, for example, in one implementation, the preconfigured memory blocks on the memory appliance 210 and the OS memory block size of the hosts 202 may each be 2 GiB.

Figure 3:
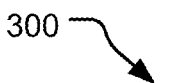
FIG. 3 illustrates an example a workflow for initialization of the memory appliance 320 that provides memory for pooling by multiple hosts.
Figure 3:
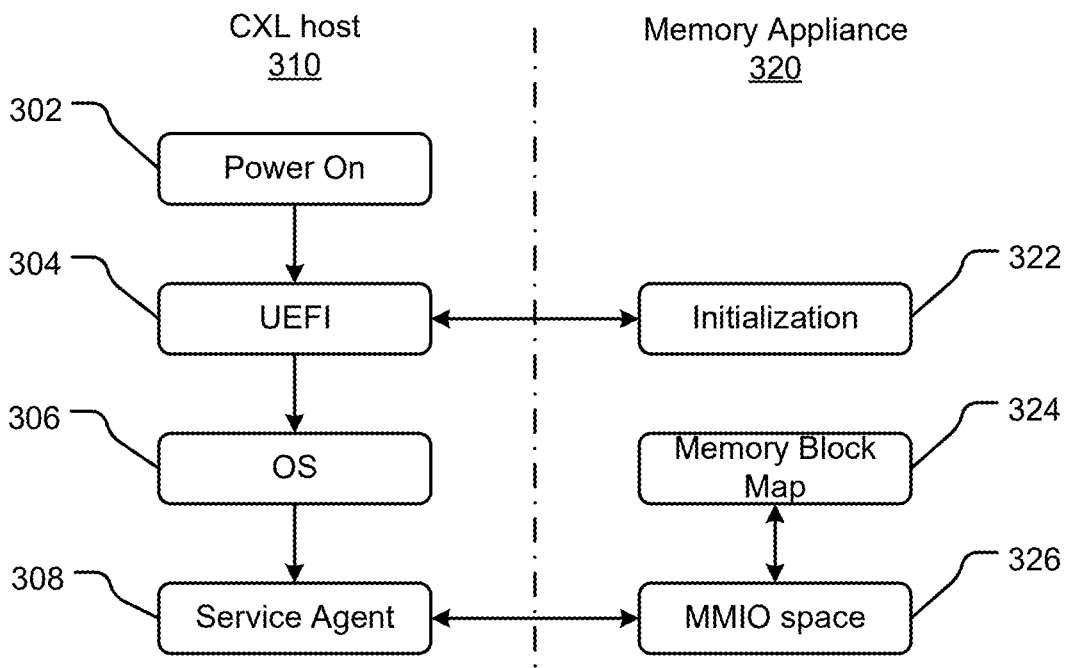

FIG. 3 below illustrates operations for initialization of the memory appliance 210 by configuring the memory appliance in a memory sharing mode before any of the CXL hosts 202 boots up. Thus, some of the memory appliance initialization operations disclosed in FIG. 3 may be stored (for example, in non-volatile memory) on the memory appliance 210 (as shown by 212) and implemented by a memory controller 214.

Now referring to FIG. 3, it illustrates a workflow 300 for configuration of the memory appliance 320 that provides memory for pooling by multiple hosts 310. The workflow 300 illustrates implementation of the fly allocation of memory from the memory appliance 320 to one or more hosts 310 connected to the memory appliance via CXL or another coherent external processor-memory interface. Specifically, the operations of the workflow 300 are performed before booting up of any of the hosts 310 that are pooling the memory from the memory appliance 320. The workflow 300 may use software on service agents 308 installed on each of the hosts 310 and firmware to be installed on the memory appliance 320.

At power on at 302, as the CXL host 310 boots up, during the CXL initialization in Unified Extensible Firmware Interface (UEFI) 304, the memory appliance 320 advertises 322 the total memory size at and the memory is marked as conventional memory with special purposed attribute. Initially, when the system on the CXL host 310 boots up, the memory from the memory appliance 320 is marked as soft-reserved memory. The service agent 308 on the CXL host 310 may scan a device list to find compatible CXL devices, such as the memory appliance 320.

At the boot up of the CXL host 310, there is host managed device (HDM) memory allocated on the CXL host 310 for each of the vector devices, including for the memory appliance 320. A range of addresses on the host are mapped to the HDM on the memory appliance 320. The range may be split into multiple memory blocks by the OS 306 of the CXL host 310.

Subsequently, one to one mapping between the memory blocks on the CXL host 310 and the memory on the memory appliance 320 is generated. The OS 306 may read the start physical address of each memory block from a system file system (sysfs) on the RAM of the CXL host 310. The CXL internal memory address for a memory block on the memory appliance 320 is calculated as the CXL host physical address (HPA) minus the starting address of the HDM on the memory appliance 320. The service agent 308 uses this to build a memory mapped I/O (MMIO) space 326 between each memory block on the CXL host and memory block map 324 on the memory appliance 320.

The OS 306 supports labeling each memory block on the CXL host 310 side as online and offline. When a memory block is labeled or marked as online, a user on the CXL host 310 side is able to use the memory block on the memory appliance that is mapped to the memory block on the CXL host that is marked online. On the other hand, when a memory block is labeled or marked as offline, a user on the CXL host 310 side is not able to use the memory block on the memory appliance that is mapped to the memory block on the CXL 310 host that is marked online. When a memory block is marked offline by the CXL host 310, one of the other CXL hosts may be able to use the memory related to that memory block on the memory appliance 320. The on-lining and off-lining of memory block is described in further detail below in FIG. 4.

Figure 4:
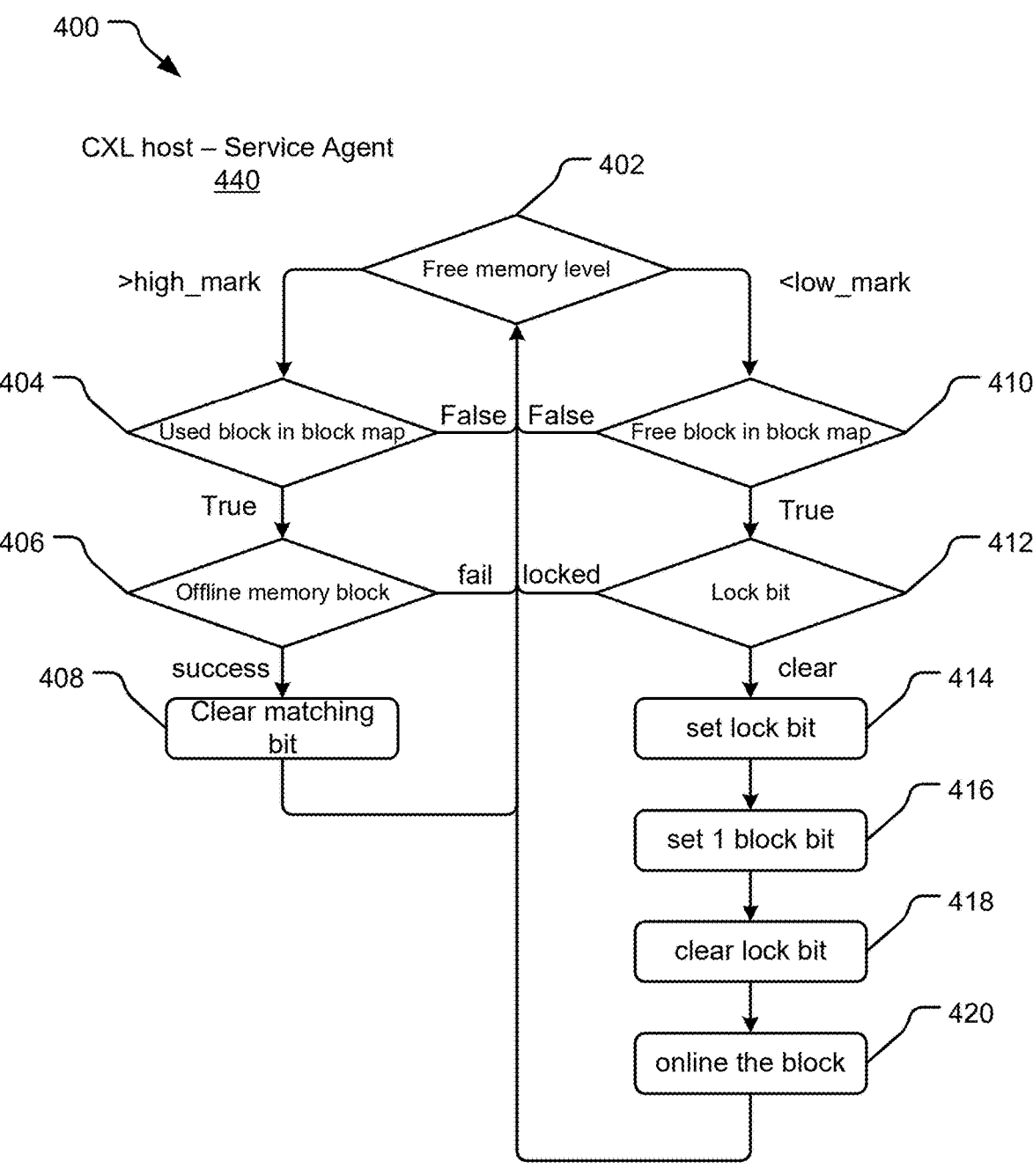
FIG. 4 illustrates example operations for dynamically labeling memory blocks of the memory appliance pooled by multiple hosts as online or offline.

Specifically, FIG. 4 illustrates operations 400 for dynamically labeling memory blocks of the memory appliance pooled by multiple hosts as online or offline. The operations 400 may be implemented by a service agent 440 on the CXL host. At operation 402, the service agent 440 monitors the usage of the total memory on the memory appliance by comparing the free memory to a low mark. If the free memory is above the high mark an operation 404 determines the service agent may try to see if it can label a memory block as offline so that that memory may be used by other CXL hosts. Specifically, an operation 404 checks if any memory block from the memory appliance is online, If so, an operation 406 determines if there is no active page in it and therefore it can be labeled offline. If yes, an operation 408 clears the matching bit for the memory block on the memory block map to mark it as offline. This memory block is now available for other CXL hosts to use.

On the other hand, if the operation 402 determines that the free memory is below the low mark, an operation 410 reads the memory block map from the PCIE configuration space to determine if any of the memory blocks in the memory block map is free. If a free memory block is found as determined by empty bits on the memory block map, an operation 412 determines if the lock bit of the free memory block is locked or not by checking the lock bit in the configuration space to avoid a race condition. If the lock bit of the free block is clear, an operation 414 sets its lock bit. Subsequently, an operation 416 sets one random clear bit from the block map and an operation 418 clears the lock. After this, the matching block number is found and an operation 420 marks the memory block as online. Once a memory is marked online, a software that is managed by the OS of the CXL host is now able to use this new online memory from the memory appliance.

For CXL hosts with multiple CXL links to the same memory appliance, the service agent may rotate the device for memory online and offline.

Figure 5:
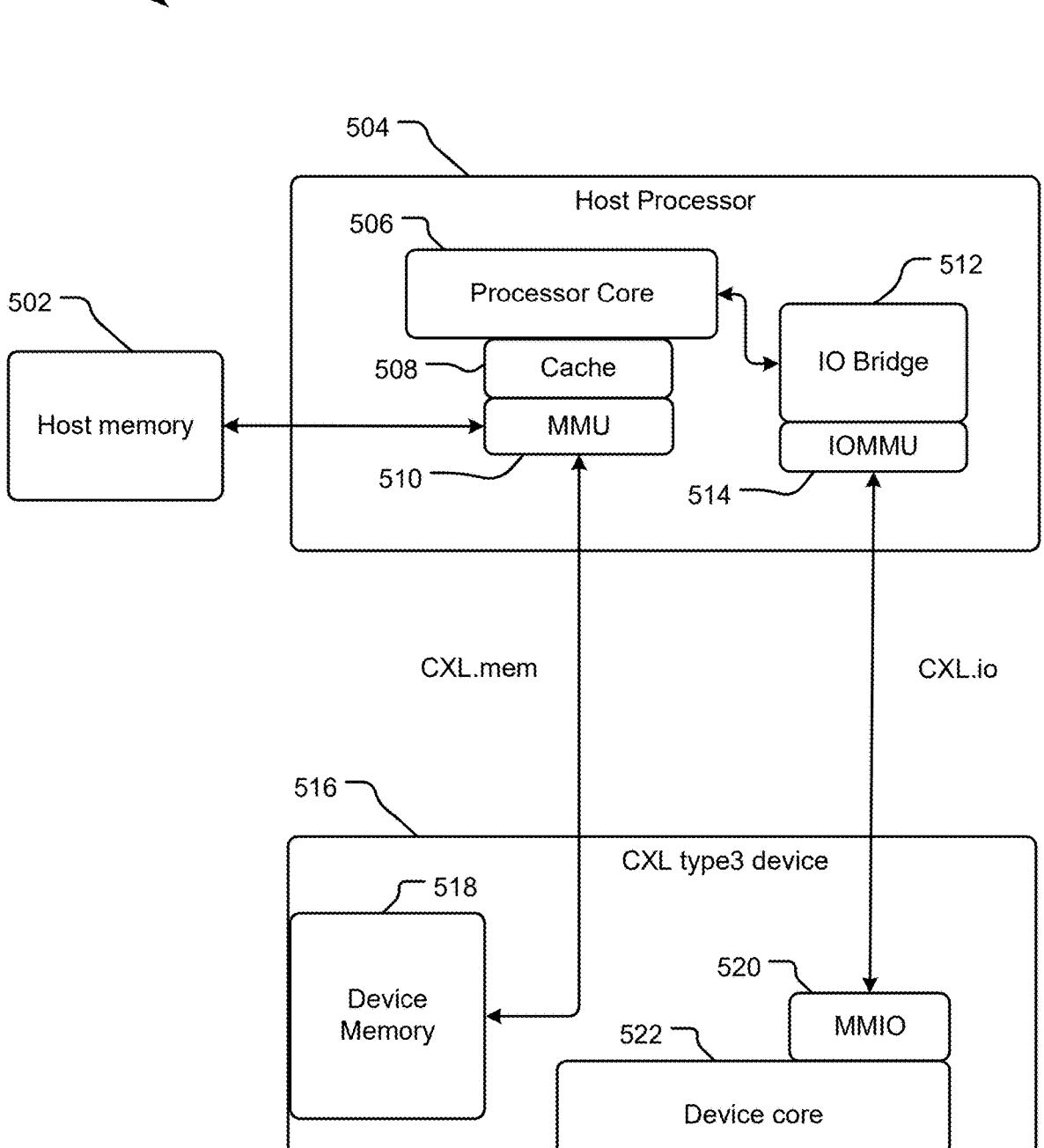
FIG. 5 illustrates an example register sync mechanism used by the software assisted memory appliance pooling system disclosed herein.

Now referring to FIG. 5, it illustrates a register sync mechanism 500 used by the software assisted memory appliance pooling system disclosed herein.

Specifically, FIG. 5 illustrates that register sync is done through memory mapped registers between a memory appliance 516 and a host server 500 having a host processor 504 and host memory 502. The host processor 504 may include a processor core 506, a cache 508, a memory management unit (MMU) 510, an input/output (IO) bridge 512, and an IO memory management unit (IOMMU) 514. The memory appliance 516 may be a CXL type 3 device and include a device memory 518, a memory management IO (MMIO) unit 520, and a device core 522.

In the illustrated implementation, the host processor 504 may communicate with the memory appliance 516 using a CXL interface. The memory appliance 516 may include a number of memory mapped registers. Specifically, one or more of the device registers may be mapped into the host 500's physical memory space 502 and when a host process running on the host 500 executes read or write commands to this memory mapped region on the host memory 502, the IO memory management unit (IOMMU) 514 sends a command to the MMIO 520 of the memory appliance 516. In an implementation, the same register region may be mapped to different hosts. So that all hosts can sync up on the same register region, and this region can be used to track memory pooling information.

Figure 6:
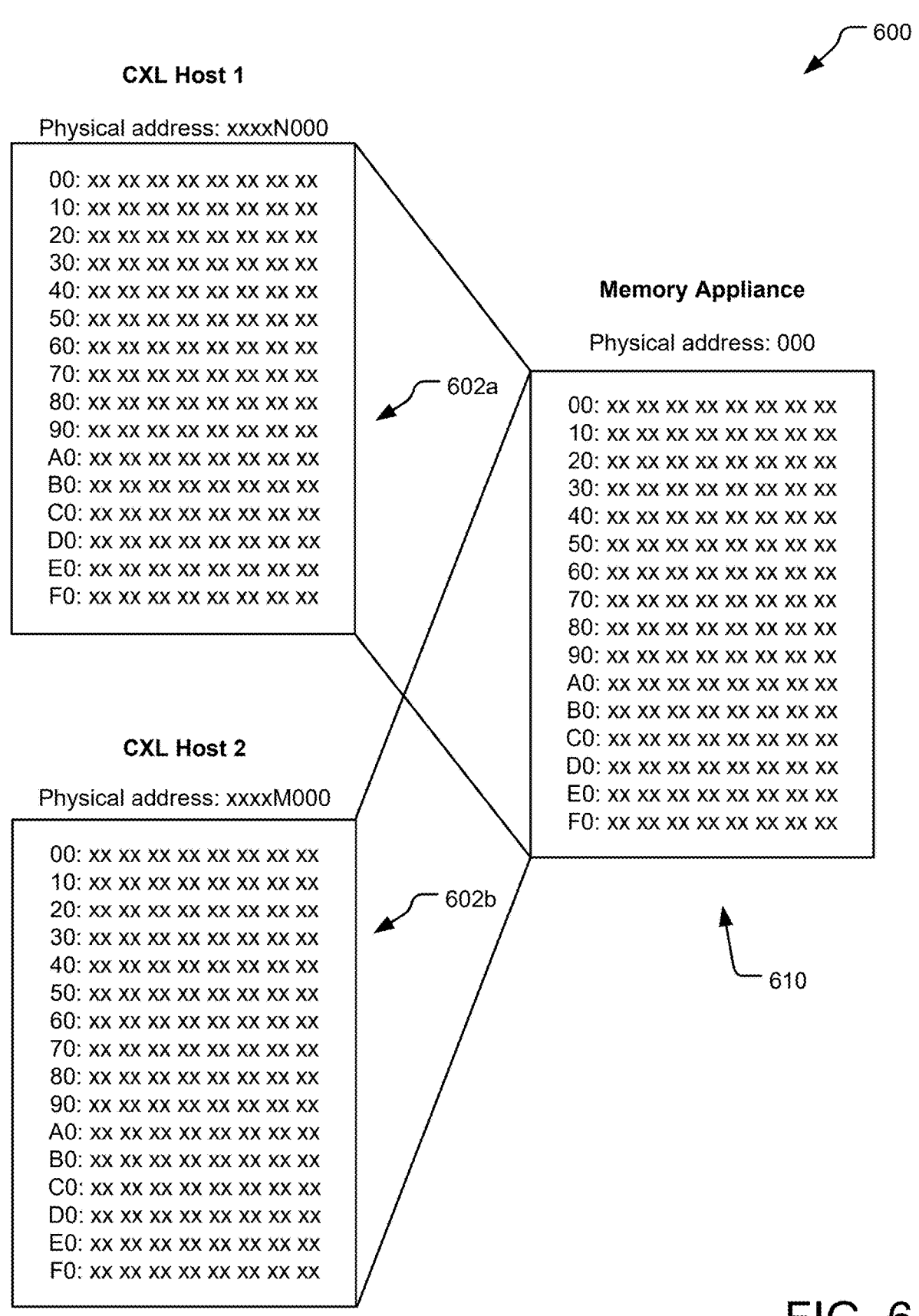
FIG. 6 illustrates an example vector defined in the memory appliance to keep track of the usage of the memory blocks.

FIG. 6 illustrates a vector 600 defined in the memory appliance to keep track of the usage of the memory blocks. The memory appliance may use the vector to communicate with the CXL hosts when two or more CXL hosts attempt to use memory blocks mapped to the same physical address. Specifically, FIG. 6 illustrates that two hosts CXL host 1 602a and CXL host 2 602b have physical addresses that are mapped to physical address space 610 on the memory appliance. Specifically, FIG. 6 illustrates that every sector of memory on each of the CXL host 1 602a and CXL host 2 602b are mapped to the same sector on the memory space on memory address space 610 on the memory appliance.

Figure 7:
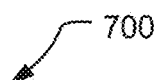
FIG. 7 illustrates example operations for sharing memory of a memory appliance between multiple hosts.
Figure 7:
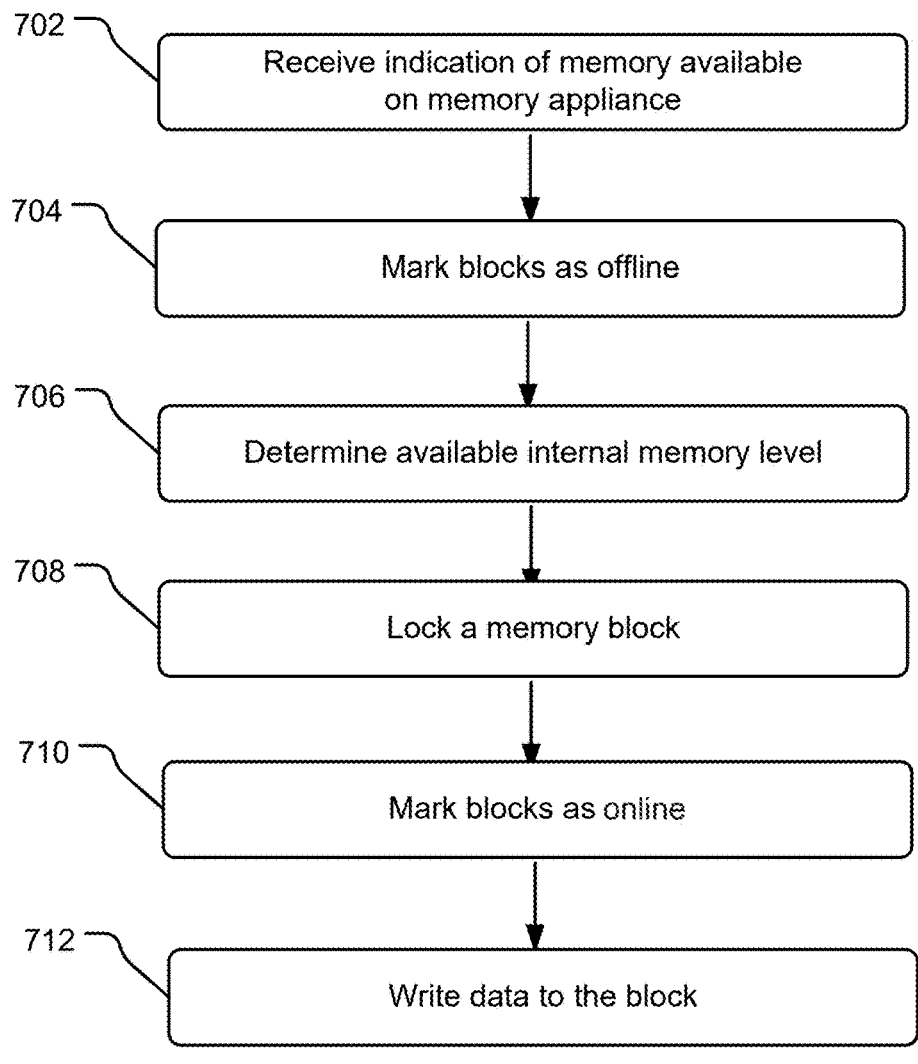

FIG. 7 illustrates operations 700 for sharing memory of a memory appliance between multiple hosts. An operation 702 receives an indication of an amount of shared memory available on the memory appliance, the memory appliance including a plurality of blocks. Specifically, a host device receives such an indication.

An operation 704 marks each block of the plurality of blocks as offline within a host memory map on the host device. Subsequently, an operation 706 determines whether an available internal memory of the host device is less than or equal to a threshold amount of internal memory.

In response to determining that the available internal memory of the host device is less than or equal to the threshold, an operation 708 sends command to the memory appliance to lock a memory block of a plurality of memory blocks. Subsequently, an operation 710 marks the locked memory block as online within the host memory map and an operation 712 writes data to the marked memory block.

In one implementation, in response to determining that the available internal memory of the host device is less than or equal to the threshold, an operation determines whether any blocks of the plurality of blocks are not in use by another host. Here sending the command locking the block is responsive to determining that the block is not in use by another host. In one implementation, such determining whether any blocks of the plurality of blocks are not in use by another host comprises reading a memory map on the memory appliance, the memory map including a block identifier and a respective lock bit that identifies whether block associated with the lock bit is in use by another host, where the command locking the block includes a command to update the lock bit to a value that indicates the block is in use. In one implementation, reading the memory may include reading a memory map from a PCIe configuration space.

Figure 8:
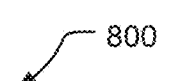
FIG. 8 illustrates an example processing system that may be useful in implementing the described technology.

FIG. 8 illustrates an example processing system 800 that may be useful in implementing the described technology. The processing system 800 is capable of executing a computer program product embodied in a tangible computer-readable memory medium to execute a computer process. Data and program files may be input to the processing system 800, which reads the files and executes the programs therein using one or more processors (CPUs or GPUs). Some of the elements of a processing system 800 are shown in FIG. 8 wherein a processor 802 is shown having an input/output (I/O) section 804, a Central Processing Unit (CPU) 806, and a memory section 808. There may be one or more processors 802, such that the processor 802 of the processing system 800 comprises a single central-processing unit 806, or a plurality of processing units. The processors may be single core or multi-core processors. The processing system 800 may be a conventional computer, a distributed computer, or any other type of computer. The described technology is optionally implemented in software loaded in memory 808, a memory unit 812, and/or communicated via a wired or wireless network link 814 on a carrier signal (e.g., Ethernet, 3G wireless, 8G wireless, LTE (Long Term Evolution)) thereby transforming the processing system 800 in FIG. 8 to a special purpose machine for implementing the described operations. The processing system 800 may be an application specific processing system configured for supporting a distributed ledger. In other words, the processing system 800 may be a ledger node.

The I/O section 804 may be connected to one or more user-interface devices (e.g., a keyboard, a touchscreen display unit 818, etc.) or a memory unit 812. In alternate designs the memory unit may be directly coupled with the CPU 806. In yet alternate designs the I/O unit for memory and its communication interface 824 may be separate from the I/O units for other peripherals. Computer program products containing mechanisms to effectuate the systems and methods in accordance with the described technology may reside in the memory section 808 or on the memory unit 812 of such a system 800.

A communication interface 824 is capable of connecting the processing system 800 to an enterprise network via the network link 814, through which the computer system can receive instructions and data embodied in a carrier wave. When used in a local area networking (LAN) environment, the processing system 800 is connected (by wired connection or wirelessly) to a local network through the communication interface 824, which is one type of communications device. When used in a wide-area-networking (WAN) environment, the processing system 800 typically includes a modem, a network adapter, or any other type of communications device for establishing communications over the wide area network. In a networked environment, program modules depicted relative to the processing system 800 or portions thereof, may be stored in a remote memory device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 808 and/or the memory unit 812 and executed by the processor 802. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 808 and/or the memory unit 812 and executed by the processor 802.

The processing system 800 may be implemented in a device, such as a user device, memory device, IoT device, a desktop, laptop, computing device. The processing system 800 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible memory device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable memory media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
scanning by a host device, at host boot up, a plurality of memory devices to determine if one of the plurality of devices is a compatible memory device;
reconfiguring the compatible memory device as offline system memory;
receiving from the compatible memory device an indication of an amount of shared memory available on the compatible memory device;
labeling each block of a plurality of memory blocks on the compatible storage device as offline within a host memory map on the host device;
comparing, by the host device, an available internal memory of the host device to a threshold amount of internal memory;
in response at least in part to comparing the available internal memory of the host device to the threshold amount of internal memory, reading a memory block map from a PCIe configuration space of the compatible memory device to identify a memory block not in use by another host; and
setting a lock bit in the PCIe configuration space to reserve the identified memory block.

2. The method of claim 1, wherein the compatible memory device is CXL type 3 memory appliance.

3. The method of claim 2, wherein the host device communicates with the compatible memory device using a CXL interface.

4. The method of claim 1, further comprising:
in response to setting a lock bit in the PCIe configuration space to reserve the identified memory block, marking, by the host device, the set as online within the host memory map.

5. The method of claim 4, further comprising:
in response to determining that the available internal memory of the host device is less than or equal to the threshold, determining whether any blocks of the plurality of blocks on the compatible memory device are not in use by another host device.

6. The method of claim 5, wherein sending the command locking a set of the plurality of blocks is responsive to determining that the set of blocks is not in use by another host.

7. The method of claim 1, wherein reading the host memory map includes reading a memory map from a PCIe configuration space.

8. The method of claim 1, wherein the host device communicates with the compatible memory device via a cache-coherent interconnect.

9. In a computing environment, a method performed at least in part on at least one processor, the method comprising:
scanning by a host device, at host boot up, a plurality of memory devices to determine if one of the plurality of devices is a compatible memory device;
reconfiguring the compatible memory device as offline system memory;
receiving from the compatible memory device an indication of an amount of shared memory available on the compatible memory device;
labeling each block of a plurality of memory blocks on the compatible storage device as offline within a host memory map on the host device;
comparing, by the host device, an available internal memory of the host device to a threshold amount of internal memory;
in response at least in part to comparing the available internal memory of the host device to the threshold amount of internal memory, reading a memory block map from a PCIe configuration space of the compatible memory device to identify a memory block not in use by another host; and
setting a lock bit in the PCIe configuration space to reserve the identified memory block.

10. The method of claim 9, wherein the compatible memory device is CXL type 3 memory appliance.

11. The method of claim 10, wherein the host device communicates with the compatible memory device using a CXL interface.

12. The system of claim 9, further comprising:
in response to setting a lock bit in the PCIe configuration space to reserve the identified memory block, marking, by the host device, the set as online within the host memory map.

13. The method of claim 12, further comprising in response to determining that the available internal memory of the host device is less than or equal to the threshold, determining whether any blocks of the plurality of blocks on the compatible memory device are not in use by another host device.

14. The method of claim 13, wherein sending the command locking a set of the plurality of blocks is responsive to determining that the set of blocks is not in use by another host.

15. The method of claim 9, wherein reading the host memory map includes reading a memory map from a PCIe configuration space.

16. One or more tangible computer-readable storage media encoding computer-executable instructions for executing on a computer system a computer process, the computer process comprising:

scanning by a host device, at host boot up, a plurality of memory devices to determine if one of the plurality of devices is a compatible memory device;

reconfiguring the compatible memory device as offline system memory;

receiving from the compatible memory device an indication of an amount of shared memory available on the compatible memory device;

labeling each block of a plurality of memory blocks on the compatible storage device as offline within a host memory map on the host device;

comparing, by the host device, an available internal memory of the host device to a threshold amount of internal memory;

in response at least in part to comparing the available internal memory of the host device to the threshold amount of internal memory, reading a memory block map from a PCIe configuration space of the compatible memory device to identify a memory block not in use by another host; and setting a lock bit in the PCIe configuration space to reserve the identified memory block.

17. One or more tangible computer-readable storage media of claim 16, wherein the computer process further comprising:

in response to setting a lock bit in the PCIe configuration space to reserve the identified memory block, marking, by the host device, the set as online within the host memory map.

18. One or more tangible computer-readable storage media of claim 17, wherein the computer process further comprising in response to determining that the available internal memory of the host device is less than or equal to the threshold, determining whether any blocks of the plurality of blocks on the compatible memory device are not in use by another host device.

19. One or more tangible computer-readable storage media of claim 18, wherein sending the command locking a set of the plurality of blocks is responsive to determining that the set of blocks is not in use by another host.

20. One or more tangible computer-readable storage media of claim 16, wherein the host device communicates with the compatible memory device via a cache-coherent interconnect.

\* \* \* \* \*